United States Patent
Sung et al.

(10) Patent No.: US 9,591,728 B2
(45) Date of Patent: Mar. 7, 2017

(54) APPARATUS AND METHOD FOR CONTROLLING ZIGBEE WIRELESS LIGHTING

(71) Applicant: Electronics and Telecommunications Research Institute, Daejeon (KR)

(72) Inventors: Jung-Sik Sung, Daejeon (KR); Jong-Woo Choi, Daejeon (KR); Hyun-Chul Kang, Daejeon (KR); Seong-Hee Park, Daejeon (KR); Hyun-Joo Kang, Daejeon (KR); In-Su Kim, Daejeon (KR); Tae-Gyu Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/631,573

(22) Filed: Feb. 25, 2015

(65) Prior Publication Data

US 2015/0245450 A1    Aug. 27, 2015

(30) Foreign Application Priority Data

Feb. 26, 2014   (KR) .................. 10-2014-0022449

(51) Int. Cl.
*H05B 37/02* (2006.01)
*H05B 33/08* (2006.01)

(52) U.S. Cl.
CPC ......... *H05B 37/0272* (2013.01); *H05B 33/08* (2013.01); *H05B 37/02* (2013.01); *Y02B 20/48* (2013.01)

(58) Field of Classification Search
CPC ................. H05B 33/08; H05B 37/02

USPC ......................... 315/153, 307, 312
See application file for complete search history.

(56) References Cited

U.S. PATENT DOCUMENTS

| | | | |
|---|---|---|---|
| 8,878,451 B2 | 11/2014 | Lee et al. | |
| 9,210,776 B2 | 12/2015 | Schenk et al. | |
| 9,288,293 B2 * | 3/2016 | Ryan | H04N 5/3532 |
| 9,295,144 B2 * | 3/2016 | Bora | H05B 33/0863 |

(Continued)

FOREIGN PATENT DOCUMENTS

| | | |
|---|---|---|
| KR | 10-2010-0026647 A | 3/2010 |
| KR | 10-1100228 B1 | 12/2011 |

(Continued)

OTHER PUBLICATIONS

Zigbee Alliance, "ZigBee Light Link: LED Lighting Control Standardized", Yonhapnews, Jan. 5, 2012, pp. 1-4.

*Primary Examiner* — Tung X Le
(74) *Attorney, Agent, or Firm* — William Park & Associates Ltd.

(57) ABSTRACT

A method and apparatus for controlling Zigbee wireless lighting are disclosed. The apparatus for controlling Zigbee wireless lighting includes an address management unit, a packet conversion unit, and a client unit. The address management unit detects a Zigbee wireless address, corresponding to a light ID included in a command received from a user terminal, in an address management table. The packet conversion unit converts the command into a Zigbee light link (ZLL)-based packet. The client unit transfers the ZLL-based packet to Zigbee wireless illumination light corresponding to the Zigbee wireless address in order to control the Zigbee wireless illumination light.

10 Claims, 7 Drawing Sheets

(56) References Cited

U.S. PATENT DOCUMENTS

| | | | | |
|---|---|---|---|---|
| 2009/0310971 | A1* | 12/2009 | Kim | H04B 10/1149 398/103 |
| 2011/0153201 | A1* | 6/2011 | Park | G01C 21/20 701/533 |
| 2012/0130519 | A1 | 5/2012 | Choi et al. | |
| 2013/0271004 | A1* | 10/2013 | Min | H05B 33/0842 315/112 |
| 2014/0015415 | A1* | 1/2014 | Lim | H05B 37/02 315/131 |
| 2014/0086590 | A1* | 3/2014 | Ganick | G06Q 30/02 398/118 |
| 2015/0230320 | A1* | 8/2015 | Gritti | H05B 37/0245 340/12.3 |
| 2016/0037611 | A1* | 2/2016 | Min | H05B 33/0842 315/152 |

FOREIGN PATENT DOCUMENTS

| | | |
|---|---|---|
| KR | 10-2012-0018760 A | 3/2012 |
| KR | 1020120140323 A | 12/2012 |

\* cited by examiner

FIG. 7

APPARATUS AND METHOD FOR CONTROLLING ZIGBEE WIRELESS LIGHTING

CROSS-REFERENCE TO RELATED APPLICATION

This application claims the benefit of Korean Patent Application No. 10-2014-0022449, filed Feb. 26, 2014, which is hereby incorporated by reference herein in its entirety.

BACKGROUND

1. Technical Field

The present disclosure relates generally to an apparatus and method of controlling Zigbee wireless lighting and, more particularly, to a method and apparatus for controlling Zigbee wireless lighting using a Zigbee light link (ZLL) over Internet Protocol (IP) using a smart phone.

2. Description of the Related Art

Technology for wirelessly controlling lighting include infrared (IR) wireless communication technology and Zigbee wireless communication technology. In general, wireless lighting is controlled using a wireless switch on which an IR wireless transmitter or a Zigbee wireless transceiver is mounted.

In the case of IR wireless communication technology, a wireless switch and an electrical/electronic device controlled by the wireless switch need to be exposed in a straight line due to the straightness and non-penetration properties of an IR ray that is used as a signal transfer means. If an obstacle is placed between IR transmission and reception modules, a problem arises in that lighting cannot be turned on and off.

Zigbee wireless communication can control LED lighting via an intermediate controller having a Zigbee wireless communication function, as disclosed in Korean Patent Application Publication No. 2012-0140323 entitled "Lighting Controller," for example.

As described above, the conventional Zigbee wireless communication technology is disadvantageous in that Zigbee wireless lighting cannot be controlled without using a Zigbee wireless switch.

SUMMARY

At least some embodiments of the present invention are directed to the provision of a method and apparatus for controlling Zigbee wireless lighting using a ZLL over IP using a smart phone.

In accordance with an aspect of the present invention, there is provided a method of controlling Zigbee wireless lighting, including searching for, by a user terminal, a Zigbee wireless illumination light; receiving device information from the found Zigbee wireless illumination light; receiving an initialization request message for initializing the state of the found Zigbee wireless illumination light; displaying an image of the initialized Zigbee wireless illumination light on the screen of the user terminal; and controlling the found Zigbee wireless illumination light by incorporating the device information into the input value based on the input value of the user terminal.

The Zigbee wireless lighting may be one of an Ethernet/Zigbee illumination light and a Zigbee gateway illumination light.

Searching for the Zigbee wireless illumination light may include broadcasting, by the user terminal, a scan request command, and searching for the Zigbee wireless illumination light.

The device information may include an ID and endpoint ID of the Zigbee wireless illumination light.

The method may further include, after receiving the device information, controlling the found Zigbee wireless illumination light or a sub-illumination light of the found Zigbee wireless illumination light so that the found Zigbee wireless illumination light or the sub-illumination light of the found Zigbee wireless illumination light performs a blinking operation by transferring an identification command to the found Zigbee wireless illumination light in order for a user to be aware of the physical location of the found Zigbee wireless illumination light.

In accordance with another aspect of the present invention, there is provided a method of controlling Zigbee wireless lighting, including searching for, by a user terminal, a Zigbee wireless illumination light; receiving device information from the found Zigbee wireless illumination light; receiving state information from the found Zigbee wireless illumination light; displaying a lighting image into which the state information has been incorporated on a screen of the user terminal; and controlling the found Zigbee wireless illumination light by incorporating the device information into the input value based on an input value of the user terminal.

The Zigbee wireless illumination light may be one of an Ethernet/Zigbee illumination light and a Zigbee gateway illumination light.

Searching for the Zigbee wireless illumination light may include broadcasting, by the user terminal, a scan request command; and searching for the Zigbee wireless illumination light.

The device information may include an ID and endpoint ID of the Zigbee wireless illumination light.

The method may further include, after receiving the device information, controlling the found Zigbee wireless illumination light or a sub-illumination light of the found Zigbee wireless illumination light so that the found Zigbee wireless illumination light or the sub-illumination light of the found Zigbee wireless illumination light performs a blinking operation by transferring an identification command to the found Zigbee wireless illumination light in order for a user to be aware of the physical location of the found Zigbee wireless illumination light.

In accordance with still another aspect of the present invention, there is provided an apparatus for controlling Zigbee wireless lighting, including an address management unit configured to detect a Zigbee wireless address, corresponding to a light ID included in a command received from a user terminal, in an address management table; a packet conversion unit configured to convert the command into a Zigbee light link (ZLL)-based packet; and a client unit configured to transfer the ZLL-based packet to Zigbee wireless illumination light corresponding to the Zigbee wireless address in order to control the Zigbee wireless illumination light.

The apparatus may further include a ZLL link control unit configured to control a connection with a ZLL-based Zigbee mobile terminal switch or a Zigbee touch pad; a Zigbee transmission/reception unit configured to receive a lighting control command from the Zigbee mobile terminal switch or the Zigbee touch pad and send a corresponding response; a ZLL packet processing unit configured to analyze the lighting control command; and a lighting control unit configured to control the Zigbee wireless illumination light based on a result of the analysis of the lighting control command.

The apparatus may further include an Ethernet control unit configured to control an Ethernet-based connection; a ZLL-over-IP packet processing unit configured to analyze the lighting control command based on a ZLL-over-IP packet; and a lighting control unit configured to control the Zigbee wireless illumination light based on the result of the analysis of the lighting control command based on the ZLL-over-IP packet.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Embodiments of the present invention will be described in detail below with reference to the accompanying drawings. Repeated descriptions and descriptions of well-known functions and configurations that have been deemed to make the gist of the present invention unnecessarily obscure will be omitted below. The embodiments of the present invention are intended to fully describe the present invention to persons having ordinary knowledge in the art to which the present invention pertains. Accordingly, the shapes, sizes, etc. of components in the drawings may be exaggerated to make the description obvious.

A method and apparatus for controlling Zigbee wireless lighting via a ZLL over IP using a smart phone according to embodiments of the present invention are described in detail below with reference to the accompanying drawings.

Figure 1:
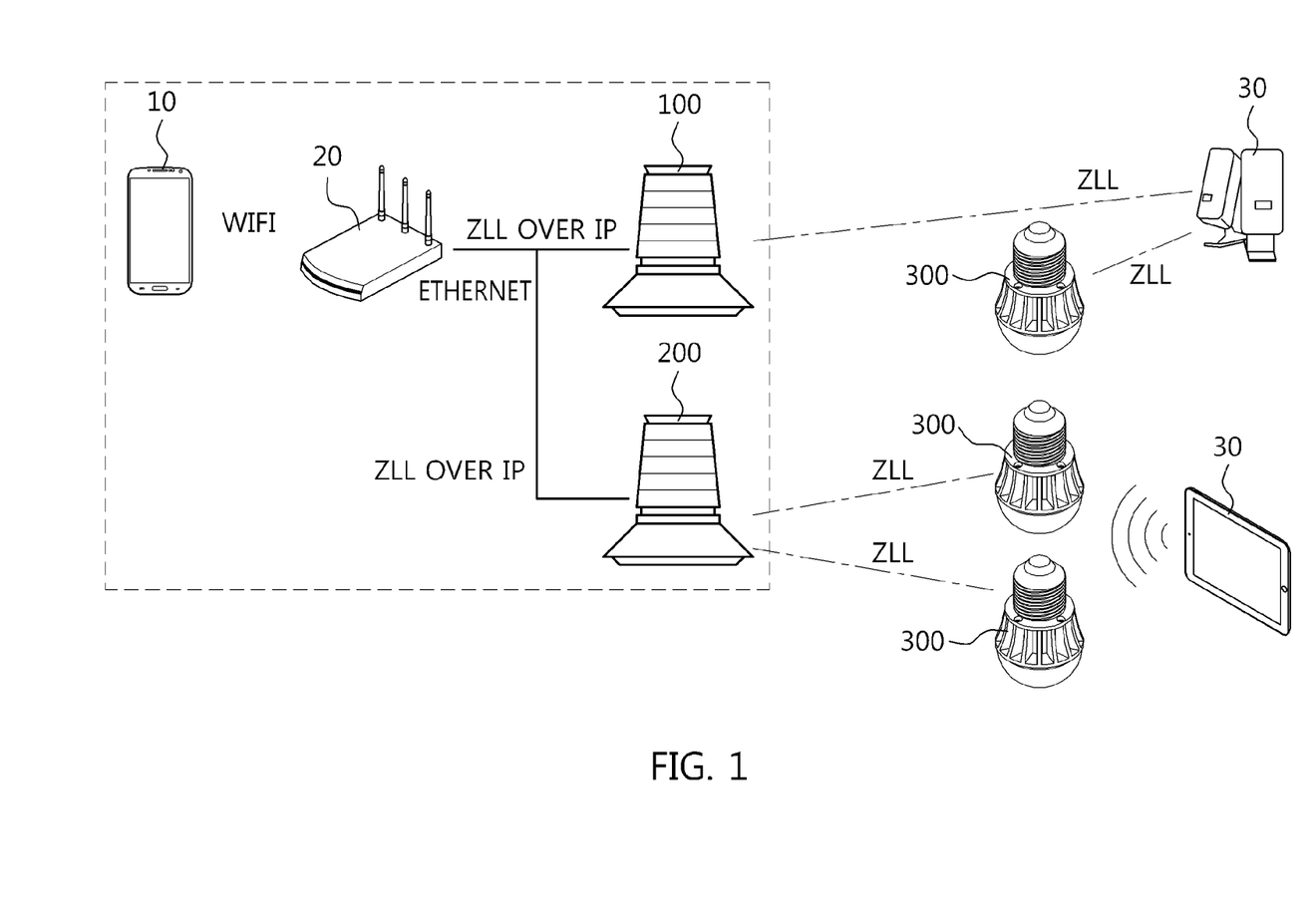
FIG. 1 is a diagram illustrating a network configuration in which Zigbee wireless lighting is controlled according to an embodiment of the present invention.

FIG. 1 is a diagram illustrating a network configuration in which Zigbee wireless lighting is controlled according to an embodiment of the present invention.

Referring to FIG. 1, a network environment in which Zigbee wireless lighting is controlled according to an embodiment of the present invention may include a terminal 10, a wireless router 20, an Ethernet/Zigbee illumination light 100, a Zigbee gateway illumination light 200, Zigbee illumination lights 300, and a Zigbee mobile terminal switch 30. In this case, the Zigbee mobile terminal switch 30 may be a Zigbee touch pad.

The Ethernet/Zigbee illumination light 100 or the Zigbee gateway illumination light 200 may be implemented based on Ethernet or a wireless LAN.

A user may wirelessly connect to the Zigbee illumination lights 300 using the Zigbee mobile terminal switch 30, and may control the Zigbee illumination lights 300 in a 1:1 or 1:N manner.

The Zigbee illumination lights 300 are lighting devices using Zigbee wireless technology, and may receive and send commands related to lighting control from and to the Zigbee mobile terminal switch 30 based on Zigbee light links (ZLLs). In this case, the ZLLs correspond to the lighting profiles of a Zigbee protocol stack.

An embodiment of the present invention proposes controlling the Zigbee illumination lights 300 or the Ethernet/Zigbee illumination light 100 using the terminal 10, for example, the smart phone 10, owned by a user in addition to the Zigbee mobile terminal switch 30.

The smart phone 10 may connect to the Ethernet/Zigbee illumination light 100 and the Zigbee gateway illumination light 200, required to control the Zigbee illumination lights 300, using the wireless router 20.

The smart phone 10 may send and receive data to and from the Zigbee gateway illumination light 200 and the Ethernet/Zigbee illumination light 100 using a ZLL over IP method.

The Zigbee gateway illumination light 200 functions to convert a link setup command and a lighting control command, received from the smart phone 10, into a ZLL-based message, transfer the converted ZLL-based message to the Zigbee illumination light 300, and transfer a message, received from the Zigbee illumination light 300, to the smart phone 10.

The Zigbee gateway illumination light 200, i.e., an apparatus for controlling Zigbee wireless lighting, is described in detail with reference to FIG. 2.

Figure 2:
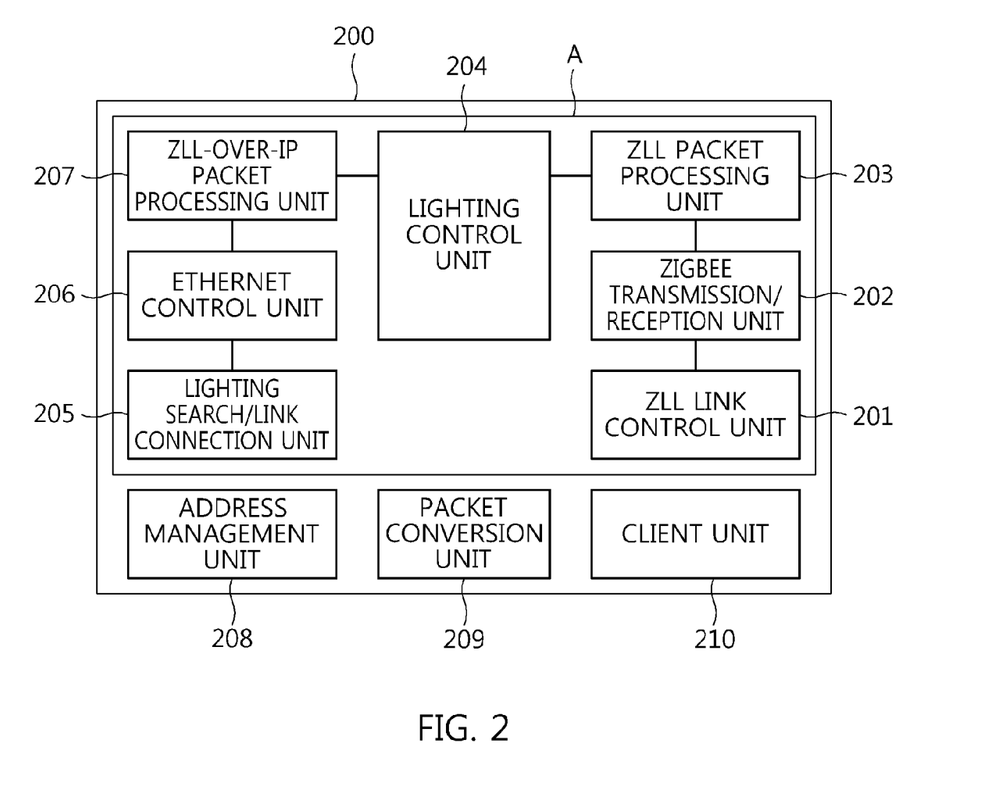
FIG. 2 is a diagram schematically illustrating the configuration of an apparatus for controlling Zigbee wireless lighting according to an embodiment of the present invention.

FIG. 2 is a diagram schematically illustrating the configuration of the apparatus for controlling Zigbee wireless lighting according to an embodiment of the present invention.

Referring to FIG. 2, the Zigbee gateway illumination light 200 may include a ZLL link control unit 201, a Zigbee transmission/reception unit 202, a ZLL packet processing unit 203, a lighting control unit 204, a lighting search/link connection unit 205, an Ethernet control unit 206, a ZLL-over-IP packet processing unit 207, an address management unit 208, a packet conversion unit 209, and a client unit 210. In this case, a portion A (i.e., the components 201 to 207) included in the Zigbee gateway illumination light 200 has the same configuration as that of the Ethernet/Zigbee illumination light 100, but is not limited thereto.

For example, the smart phone 10 may directly transfer a lighting control command to the Ethernet/Zigbee illumination light 100 based on a ZLL over IP using Ethernet. The Ethernet/Zigbee illumination light 100 functions to analyze a lighting control command received from the smart phone 10 and control LED lighting based on the result of the analysis. Components for performing this function may include the lighting control unit 204, the lighting search/link connection unit 205, the Ethernet control unit 206 and the ZLL-over-IP packet processing unit 207, but are not limited thereto.

Furthermore, like the Zigbee illumination light 300, the Zigbee mobile terminal switch 30 or the Zigbee touch pad 30 may connect to the Ethernet/Zigbee illumination light 100 via wireless Zigbee, and may control the Ethernet/Zigbee illumination light 100 based on a ZLL. Components for performing this function may include the ZLL link control unit 201, the Zigbee transmission/reception unit 202, the ZLL packet processing unit 203 and the lighting control unit 204, but are not limited thereto.

The smart phone 10 may have been aware of the IP address of the Ethernet/Zigbee illumination light 100, or may search for an illumination light that may be connected to itself via broadcasting. In this case, the function of connecting to the Ethernet/Zigbee illumination light 100 based on Ethernet may be performed by the lighting search/link connection unit 205, and the Ethernet control unit 206 and the ZLL-over-IP packet processing unit 207 may function to process a lighting control command based on a ZLL-over-IP packet that is received from the smart phone 10, but is not limited thereto.

More specifically, the ZLL link control unit 201 controls a ZLL-based link, for example, a connection with the Zigbee mobile terminal switch 30 or the Zigbee touch pad 30.

The Zigbee transmission/reception unit 202 receives a lighting control command from the Zigbee mobile terminal switch 30 or the Zigbee touch pad 30, and transfers a corresponding response to the Zigbee mobile terminal switch 30 or the Zigbee touch pad 30.

The ZLL packet processing unit 203 analyzes a ZLL-based lighting control command, and sends the result of the analysis to the lighting control unit 204.

The lighting search/link connection unit 205 establishes a connection with the smart phone 10 based on Ethernet.

The Ethernet control unit 206 controls an Ethernet-based connection.

The ZLL-over-IP packet processing unit 207 analyzes a lighting control command based on a ZLL-over-IP packet, and sends the result of the analysis to the lighting control unit 204.

The lighting control unit 204 receives the result of a packet processed by the ZLL packet processing unit 203 or the ZLL-over-IP packet processing unit 207, i.e., the result of an analysis of a lighting control command, and controls lighting based on the result.

The Zigbee gateway illumination light 200 according to an embodiment of the present invention functions as a gateway for controlling the Zigbee illumination light 300 that does not support Ethernet or Wi-Fi using the smart phone 10.

The address management unit 208 detects a Zigbee wireless address, corresponding to a light ID included in a command received from the smart phone 10, in an address management table (not illustrated).

The packet conversion unit 209 converts a command, received from the smart phone 10, into a ZLL-based packet.

The client unit 210 transfers a ZLL-based packet to the Zigbee illumination light 300 corresponding to a Zigbee wireless address detected by the address management unit 208 so that lighting control is performed.

The screens of the smart phone 10 when an application is executed in order to control the Zigbee wireless lighting in the smart phone 10 are described in detail with reference to FIGS. 3 and 4.

Figure 3:
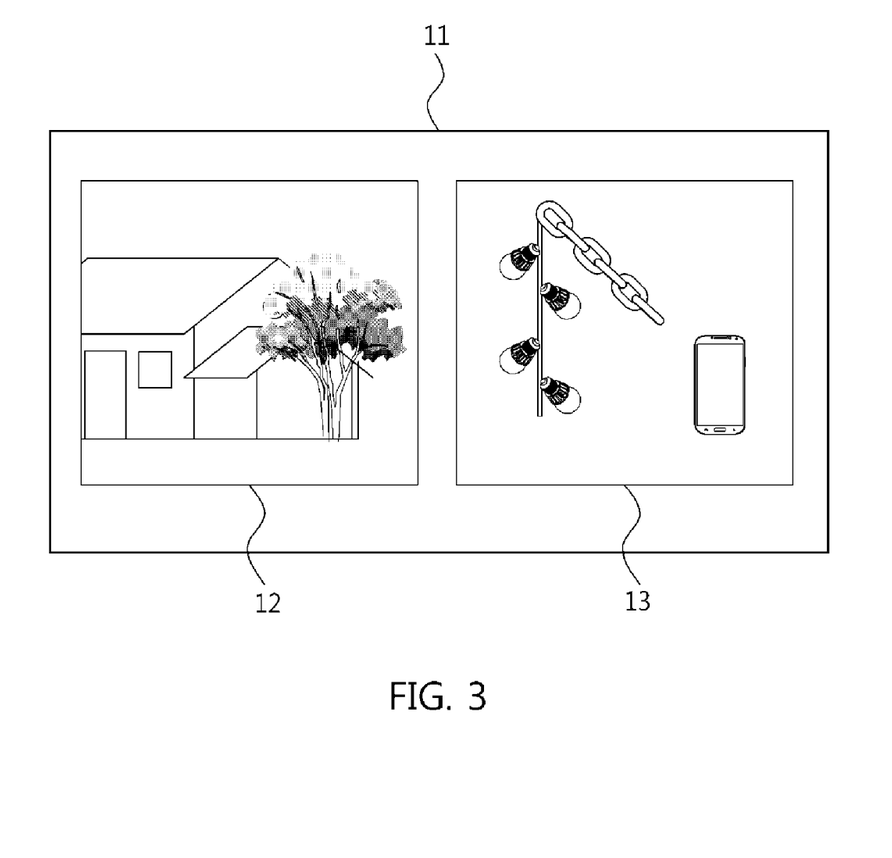
FIGS. 3 and 4 are diagrams illustrating screens when an application is executed in order to control Zigbee wireless lighting using a smart phone according to an embodiment of the present invention.
Figure 4:
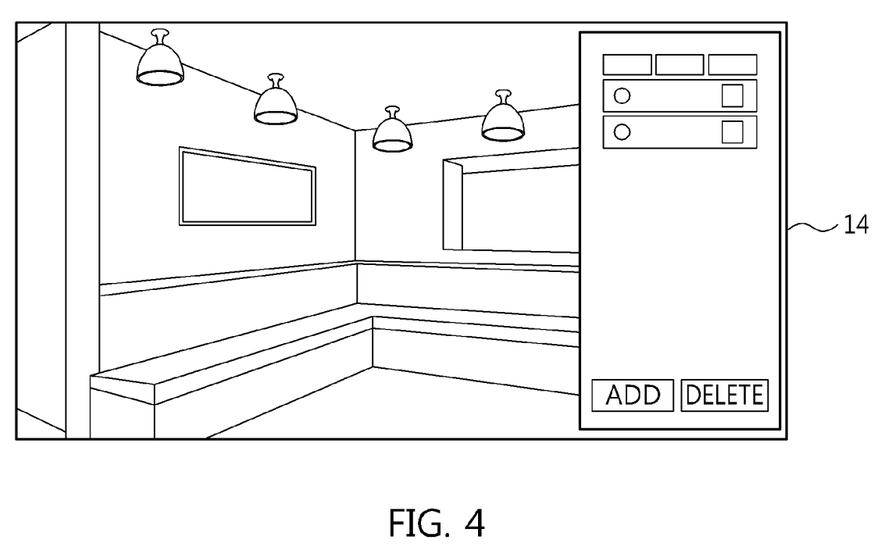

FIGS. 3 and 4 are diagrams illustrating screens when an application is executed in order to control Zigbee wireless lighting using a smart phone according to an embodiment of the present invention.

Referring to FIG. 3, the smart phone 10 provides a user with an application screen 11 in order to control Zigbee wireless lighting.

In this case, the smart phone 10 provides a home image 12 in which an image of a house or an office is statically constructed, corresponding light IDs and ID addresses are set up, and then lighting can be controlled based on the light IDs and the ID addresses, and a lighting search image 13 in which one or more illumination lights to which the smart phone 10 can be connected are dynamically searched for and then lighting can be controlled.

A user may select one of the home image 12 and the lighting search image 13, and may control lighting.

For example, when a user selects a living room from the home image 12, the smart phone 10 provides a living room screen 14, such as that of FIG. 4. Accordingly, the user may click on lighting within the living room screen 14, and may control lighting.

A method of controlling Zigbee wireless lighting is described in detail below with reference to FIGS. 5 and 6.

Figure 5:
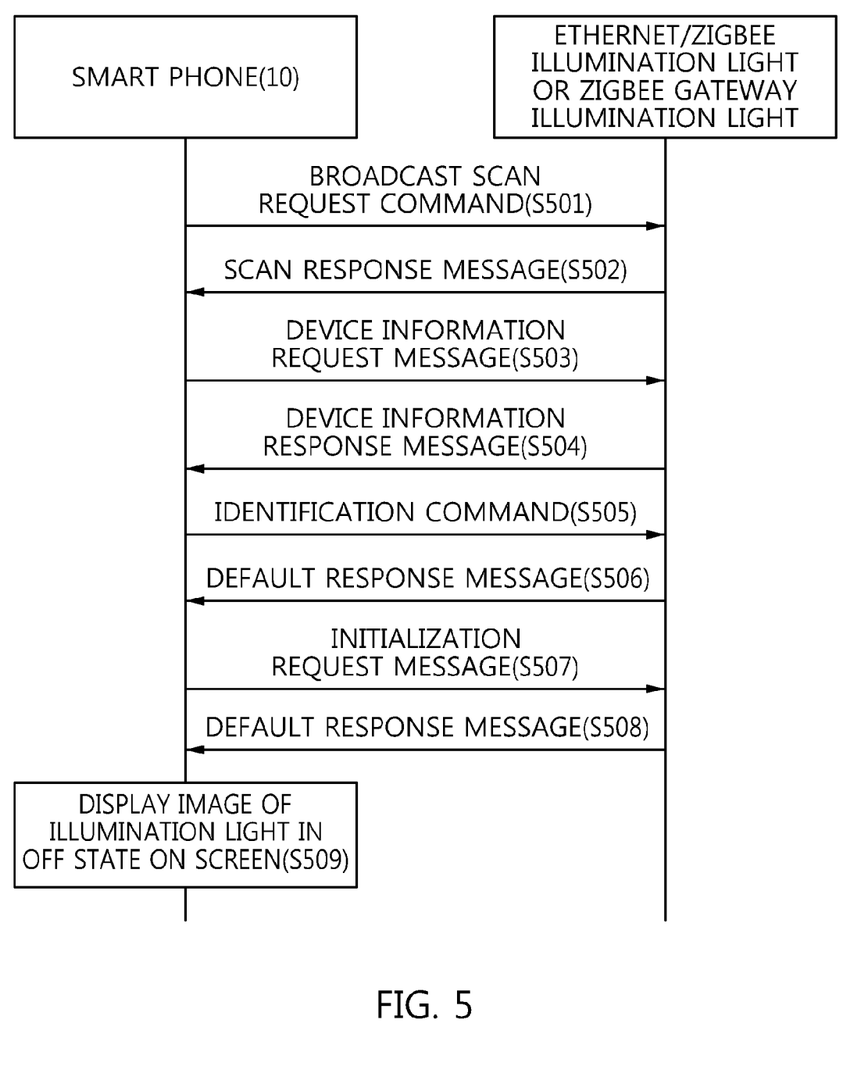
FIG. 5 is a flowchart illustrating a method of controlling Zigbee wireless lighting according to an embodiment of the present invention.

FIG. 5 is a flowchart illustrating a method of controlling Zigbee wireless lighting according to an embodiment of the present invention.

First, the smart phone 10 provides a home image 12 in which an image of a house or an office is statically constructed, corresponding light IDs and corresponding ID addresses are set up, and lighting can be controlled based on the light IDs and the ID addresses, and a lighting search image 13 in which one or more illumination lights to which the smart phone 10 may be connected are dynamically searched for and then lighting can be controlled, as illustrated in FIG. 3.

The method of controlling Zigbee wireless lighting is described with reference to FIG. 5 using the flow of messages between the smart phone 10 and the Ethernet/Zigbee illumination light 100 or Zigbee gateway illumination light 200 when a user selects the lighting search image 13 from the application screen 11 of the smart phone 10. Hereinafter, the Ethernet/Zigbee illumination light 100 or the Zigbee gateway illumination light 200 are also referred to as the illumination light 100 or 200.

Referring to FIG. 5, the smart phone 10 broadcasts a scan request command in order to search for an illumination light at step S501.

When the scan request command is received, the illumination light 100 or 200 sends a scan response corresponding to the result of the reception, i.e., a scan response message, including its own light ID, an endpoint ID, an IP address, and the number of sub-illumination lights, to the smart phone 10 at step S502.

If the number of sub-illumination lights included in the scan response message is one or more, the smart phone 10 sends a device information request message to the illumination light 100 or 200 that has sent the scan response message at step S503.

The illumination light 100 or 200 sends a device information response message, including device information (i.e., light IDs and endpoint IDs) sub-illumination lights managed by the illumination light 100 or 200, to the smart phone 10 at step S504.

The smart phone 10 stores the light IDs, the endpoint IDs, and the IP addresses, included in the received device information response message, in the address management table so that the stored IDs and addresses are used when control commands for lighting are processed.

The smart phone 10 sends an identification command to the illumination light 100 or 200 in order for a user to be aware of the physical locations of the illumination lights that have now been found at step S505.

The illumination light 100 or 200 performs control so that it or its sub-illumination light performs a blinking operation based on the received identification command and, thus, the user is aware of the illumination light or the sub-illumination light and sends a default response message to the smart phone 10 at step S506.

The smart phone 10 generates an initialization request message that initializes the state of lighting that has now been set and then sends the generated initialization request message to the illumination light 100 or 200 at step S507.

The illumination light 100 or 200 initializes itself or its sub-illumination light in response to the received initialization request message and then sends a default response message, corresponding to the initialized results, to the smart phone 10 at step S508.

The smart phone 10 displays images of all types of found illumination lights on a screen at step S509. In this case, lighting is in an off state because it has been initialized at step S508.

A method of differently controlling lighting without initializing the state of lighting after the lighting has been found in the method of controlling Zigbee wireless lighting, as illustrated in FIG. 5, is described in detail below with reference to FIG. 6.

Figure 6:
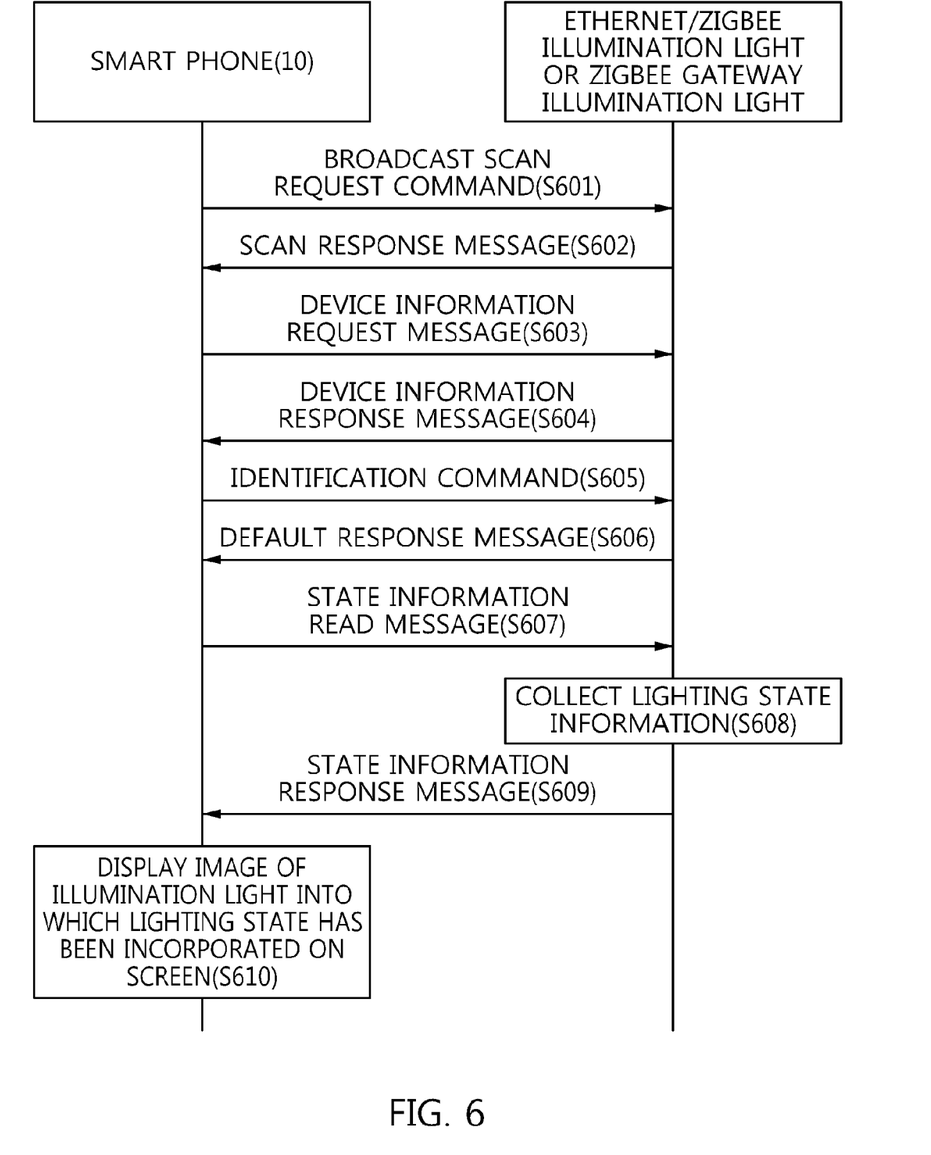
FIG. 6 is a flowchart illustrating a method of controlling Zigbee wireless lighting according to another embodiment of the present invention.

FIG. 6 is a flowchart illustrating a method of controlling Zigbee wireless lighting according to another embodiment of the present invention.

Referring to FIG. 6, the smart phone 10 broadcasts a scan request command in order to search for an illumination light at step S601.

When receiving the scan request command, the illumination light 100 or 200 sends a scan response corresponding to the result of the reception, i.e., a scan response message, including its own light ID, an endpoint ID, an IP address, and the number of sub-illumination lights, to the smart phone 10 at step S602.

If the number of sub-illumination lights included in the scan response message is one or more, the smart phone 10 sends a device information request message to the illumination light 100 or 200 that has sent the scan response message at step S603.

The illumination light 100 or 200 sends a device information response message, including device information (e.g., light IDs and endpoint IDs) about the sub-illumination lights managed by the illumination light 100 or 200, to the smart phone 10 at step S604.

The smart phone 10 stores the light IDs, the endpoint IDs, and the IP address, included in the received scan response message, in the address management table so that the stored IDs and address are used when control commands for lighting are processed.

The smart phone 10 sends an identification command to the illumination light 100 or 200 in order for a user to be aware of the physical locations of the illumination lights that have now been found at step S605.

The illumination light 100 or 200 performs control so that it or its sub-illumination light performs a blinking operation based on the received identification command and thus the user is aware of the illumination light or the sub-illumination light and then sends a default response message to the smart phone 10 at step S606.

As described above, the steps S601 to S606 of the process of dynamically searching for an illumination light at the smart phone 10 are the same as steps S501 to S506 of FIG. 5.

Referring to FIG. 6, the smart phone 10 generates a state information read message for reading information about the state of the found illumination lights in order to maintain the states of the illumination lights that have now been set without initializing the illumination lights and then sends the generated state information read message to the illumination light 100 or 200 at step S607.

The illumination light 100 or 200 collects information about the state of itself or its sub-illumination lights at step S608 and sends a state information response message, including the collected state information, to the smart phone 10 at step S609.

The smart phone 10 displays a lighting image into which the lighting state has been incorporated based on the state information included in the state information response message at step S610.

More specifically, if information about a group or a scene is included in the state information, the smart phone 10 sends a group membership information request message or a scene membership information request message, collects related information, and displays a lighting image into which a lighting state has been incorporated on a screen.

A message format exchanged when the smart phone 10 exchanges data with the Ethernet/Zigbee illumination light 100 or the Zigbee gateway illumination light 200 is described in detail with reference to FIG. 7.

Figure 7:
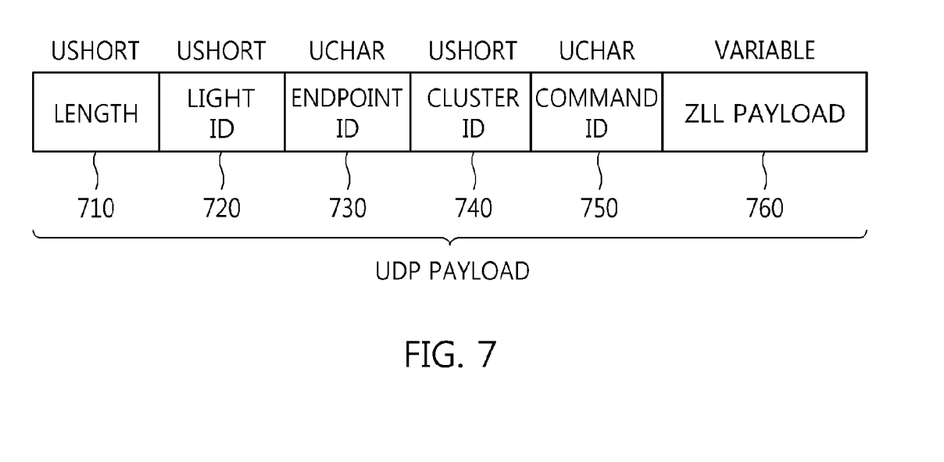
FIG. 7 is a diagram illustrating a message format exchanged between a smart phone and an illumination light according to an embodiment of the present invention.

FIG. 7 is a diagram illustrating a message format used between a smart phone and an illumination light according to an embodiment of the present invention.

According to an embodiment of the present invention, the smart phone 10 may communicate with the Ethernet/Zigbee illumination light 100 or the Zigbee gateway illumination light 200 over an Ethernet or a Wi-Fi network, and sends and receives messages to and from the Ethernet/Zigbee illumination light 100 or the Zigbee gateway illumination light 200 based on the UDP/IP.

Referring to FIG. 7, a UDP payload message may include a header and a ZLL payload 760 for Zigbee wireless lighting processing.

The header includes a total of 8 bytes, including a 2-byte length field 710 indicative of the over length of a message, a light ID field 720 indicative of the unique light identifier of each illumination light, a 1-byte endpoint ID 730, a 2-byte cluster ID 740 indicative of the message recipient and command identifier of a ZLL payload, and a 1-byte command ID 750. When the Ethernet/Zigbee illumination light 100 or the Zigbee gateway illumination light 200 manages a sub-illumination light, the endpoint ID 730 is used as an identifier to identify the corresponding sub-illumination light.

As described above, the present invention enables a smart phone to be dynamically connected to Zigbee wireless lighting everywhere without information about the Zigbee wireless lighting, and can control Zigbee wireless lighting using conventional standard ZLL wireless control commands based on a ZLL over IP when Zigbee wireless control is performed.

Furthermore, the present invention can control Zigbee wireless lighting using a Zigbee switch, and also control Zigbee wireless lighting using a smart phone carried by a user even when the smart phone does not have a Zigbee wireless function.

As described above, the optimum embodiments have been disclosed in the drawings and the specification. Although specific terms have been used herein, they have been used merely for the purpose of describing the present invention, but have not been used to restrict their meanings or limit the scope of the present invention set forth in the claims. Accordingly, it will be understood by those having ordinary knowledge in the relevant technical field that various modifications and other equivalent embodiments can be made.

Therefore, the true ranges of protection of the present invention should be defined based on the technical spirit of the attached claims.

What is claimed is:

1. A method of controlling Zigbee wireless lighting, comprising:
    searching for, by a user terminal, a Zigbee wireless illumination light;
    receiving device information from the found Zigbee wireless illumination light;
    receiving an initialization request message for initializing a state of the found Zigbee wireless illumination light;
    displaying an image of the initialized Zigbee wireless illumination light on a screen of the user terminal;
    controlling the found Zigbee wireless illumination light by incorporating the device information into the input value based on an input value of the user terminal; and
    after receiving the device information, controlling the found Zigbee wireless illumination light or a sub-illumination light of the found Zigbee wireless illumination light so that the found Zigbee wireless illumination light or the sub-illumination light of the found Zigbee wireless illumination light performs a blinking operation by transferring an identification command to the found Zigbee wireless illumination light in order for a user to be aware of a physical location of the found Zigbee wireless illumination light.

2. The method of claim 1, wherein the Zigbee wireless lighting is one of an Ethernet/Zigbee illumination light and a Zigbee gateway illumination light.

3. The method of claim 1, wherein searching for the Zigbee wireless illumination light comprises: broadcasting, by the user terminal, a scan request command, and searching for the Zigbee wireless illumination light.

4. The method of claim 1, wherein the device information comprises an ID and endpoint ID of the Zigbee wireless illumination light.

5. A method of controlling Zigbee wireless lighting, comprising:
    searching for, by a user terminal, a Zigbee wireless illumination light;
    receiving device information from the found Zigbee wireless illumination light;
    receiving state information from the found Zigbee wireless illumination light;
    displaying a lighting image into which the state information has been incorporated on a screen of the user terminal;
    controlling the found Zigbee wireless illumination light by incorporating the device information into the input value based on an input value of the user terminal; and
    after receiving the device information, controlling the found Zigbee wireless illumination light or sub-illumination light of the found Zigbee wireless illumination light so that the found Zigbee wireless illumination light or sub-illumination light of the found Zigbee wireless illumination light performs a blinking operation by transferring an identification command to the found Zigbee wireless illumination light in order for a user to be aware of a physical location of the found Zigbee wireless illumination light.

6. The method of claim 5, wherein the Zigbee wireless illumination light is one of an Ethernet/Zigbee illumination light and a Zigbee gateway illumination light.

7. The method of claim 5, wherein searching for the Zigbee wireless illumination light comprises:
    broadcasting, by the user terminal, a scan request command; and
    searching for the Zigbee wireless illumination light.

8. The method of claim 5, wherein the device information comprises an ID and endpoint ID of the Zigbee wireless illumination light.

9. An apparatus for controlling Zigbee wireless lighting, comprising:
    an address management unit configured to detect a Zigbee wireless address, corresponding to a light ID included in a command received from a user terminal, in an address management table;
    a packet conversion unit configured to convert the command into a Zigbee light link (ZLL)-based packet;
    a client unit configured to transfer the ZLL-based packet to Zigbee wireless illumination light corresponding to the Zigbee wireless address in order to control the Zigbee wireless illumination light;
    a ZLL link control unit configured to control a connection with a ZLL-based Zigbee mobile terminal switch or a Zigbee touch pad;
    a Zigbee transmission/reception unit configured to receive a lighting control command from the Zigbee mobile terminal switch or the Zigbee touch pad and send a corresponding response;
    a ZLL packet processing unit configured to analyze the lighting control command; and
    a lighting control unit configured to control the Zigbee wireless illumination light based on a result of the analysis of the lighting control command.

10. An apparatus for controlling Zigbee wireless lighting, comprising:
    an address management unit configured to detect a Zigbee wireless address, corresponding to a light ID included in a command received from a user terminal, in an address management table;
    a packet conversion unit configured to convert the command into a Zigbee light link (ZLL)-based packet;
    a client unit configured to transfer the ZLL-based packet to Zigbee wireless illumination light corresponding to the Zigbee wireless address in order to control the Zigbee wireless illumination light;
    an Ethernet control unit configured to control an Ethernet-based connection;
    a ZLL-over-IP packet processing unit configured to analyze the lighting control command based on a ZLL-over-IP packet; and
    a lighting control unit configured to control the Zigbee wireless illumination light based on a result of the analysis of the lighting control command based on the ZLL-over-IP packet.

* * * * *